United States Patent [19]
Wible

[11] Patent Number: 4,903,054
[45] Date of Patent: Feb. 20, 1990

[54] OBSTACLE DETECTION SYSTEM

[75] Inventor: John E. Wible, Plainesville, Ohio

[73] Assignee: Caterpillar Industrial Inc., Mentor, Ohio

[21] Appl. No.: 248,878

[22] Filed: Sep. 23, 1988

[51] Int. Cl.⁴ ............................................. G01N 21/86
[52] U.S. Cl. .................................... 250/561; 250/239; 180/275
[58] Field of Search .............................. 250/561, 239; 180/167-169, 275

[56] References Cited

U.S. PATENT DOCUMENTS

| | | | |
|---|---|---|---|
| 2,522,637 | 9/1950 | Pripeton | 250/239 |
| 3,664,701 | 5/1972 | Kondur | 180/275 |
| 4,722,410 | 2/1988 | Melocik et al. | 180/275 |
| 4,730,690 | 3/1988 | McNutt et al. | 180/274 |

Primary Examiner—David C. Nelms
Attorney, Agent, or Firm—Alan J. Hickman

[57] ABSTRACT

An obstacle detection system for protecting a frame upper end portion and laser scanning device of a self guided vehicle from damage by external objects includes a device for delivering a light signal in a direction along a preselected elevationally oriented axis and a device for receiving a reflection of the delivered light signal and delivering a condition control signal in response to receiving the reflected light signal. A supporting assembly is connected to the frame upper end portion and a guide frame is connected to the supporting assembly and defines a plane passing through the elevationally oriented axis. A reflecting member is supported on the guide frame and a connecting device connects the reflecting member to the support assembly and maintains the reflecting member for movement between a first position at which the reflecting member reflects the light signal towards the receiving device and a second position spaced from the first position at which the reflecting member is free from reflecting the light signal towards the receiving device.

20 Claims, 3 Drawing Sheets

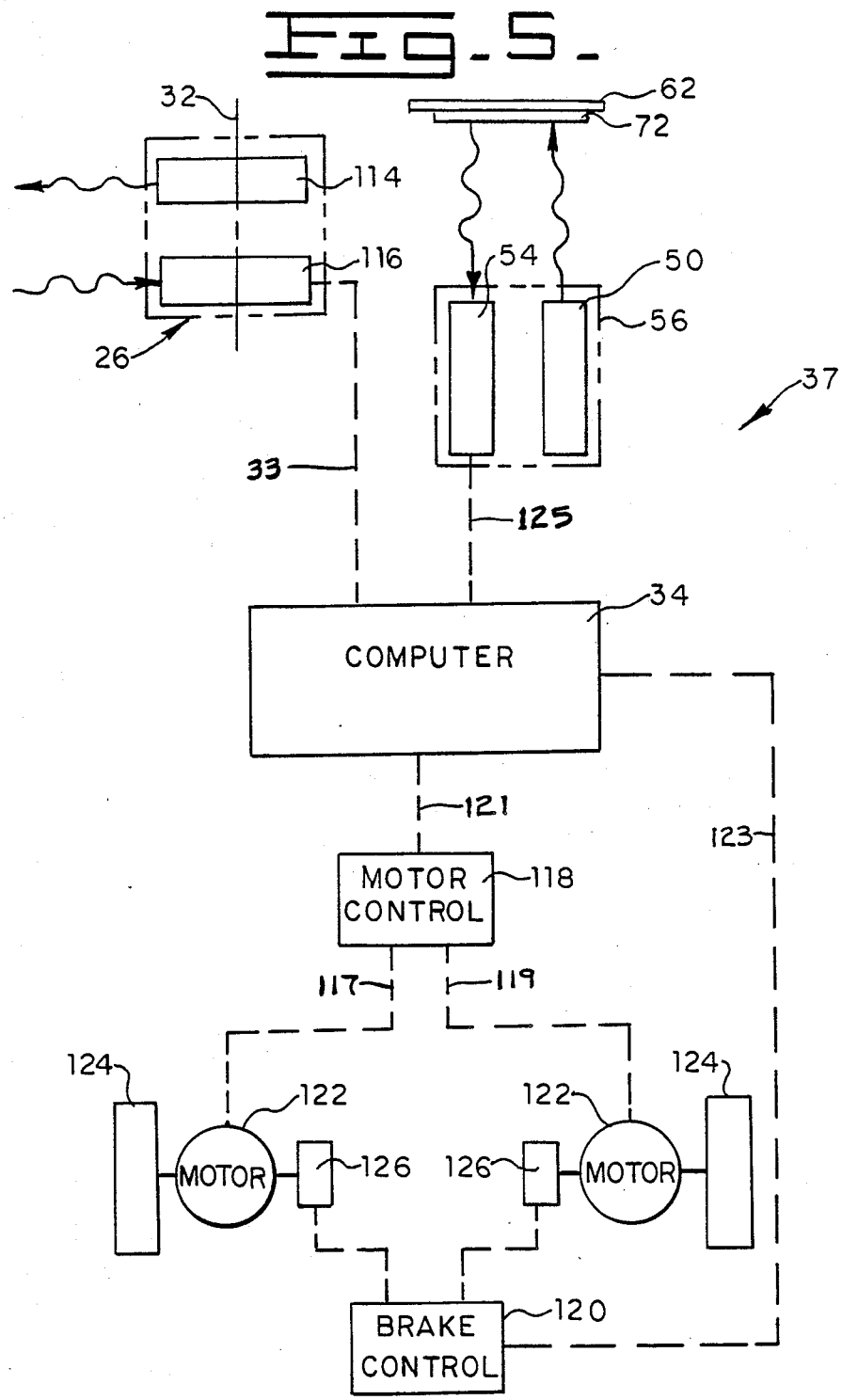

OBSTACLE DETECTION SYSTEM

DESCRIPTION

1. Technical Field

This invention relates to an obstacle detection system for a self guided vehicle and more particularly to a self guided vehicle having an upper end portion, a laser scanner mounted on an upper end portion, and an obstacle detection system for preventing damage to the laser scanner and/or the upper end portion of the vehicle.

2. Background Art

Material handling vehicles and particularly self guided material handling vehicles often have obstacle detection systems mounted on the vehicle to identify when an object is in the path of travel of the vehicle and to stop powered travel of the vehicle upon contact between the vehicle and a portion of the detection system. Typically, these systems are suited for detecting an object which is adjacent the vehicle and at a relatively close distance to the surface upon which the vehicle operates An example of such a system is shown in U.S. Pat. No. 3,664,701 to L. Kondur wherein a flexible bumper having a reflective target mounted on a rear bumper surface reflects a light from a conventional light source to a light sensor in the absence of contact between an object and the bumper. When the bumper contacts an object the reflective target will move so that the light is not received by the sensor. This movement will result in slowing and/or stopping of the vehicle.

Obstacle detection systems heretofore provided do not sense objects which are at an elevational location adjacent an upper end portion of the vehicle or above the vehicle bumper. Therefore, obstacles (objects) such as overhead suspended hooks, clamps and the like as well as other obstacles such as truck and trailer load carrying beds and the like which are above the bumper, are not subject to detection which may result in collision between the object and the vehicle. In self guided vehicles having a sensitive laser scanner accurately mounted on an upper end portion of the vehicle frame, the slightest movement of the scanner caused by contact with an object can affect the accuracy of vehicle navigation.

Bumpers or support assemblies which carry reflective targets are normally flexible and pivotally mounted to the vehicle so that contact between the bumper and an object will cause movement of the bumper and target relative to the source of light and the light sensor. The size of the reflective target, and the distance and location of the reflective target relative to the light source and sensor establishes the amount of movement required of the bumper to cause the control system to initiate vehicle braking. Therefore, the accuracy of position of the target is important and must be maintained within a preselected location and within acceptable tolerances in order for the system to perform adequately and within desired parameters. Support assemblies, such as bumpers or some other flexible support, tend to sag or droop over a period of time under the force of gravity which results in movement of the target (reflecting member) This results in improper alignment between the target, and the light source and sensor, and causes inaccurate and undesirable operation of the detection system. Support wires, linkage, and the like have been provided to support the flexible assembly and alleviate the problems of sag and droop. These solutions, however, have demonstrated only limited success and require frequent adjustment in order to maintain the target at the desired location.

In order for a flexible support assembly to perform properly it must return the reflector to a neutral or set position after encountering an object and subsequent to removal of the object. Should the target not return to the set position the intensity of reflected light directed toward the light receiver will not be of a magnitude great enough to enable operation of the vehicle. A malfunction such as this is particularly unacceptable in automated material handling, transportation and manufacturing operations wherein self guided vehicles are used as it can cause the entire operation to cease until the vehicle is removed from operation.

Bouncing of the flexible support assembly will occur during travel of the self guided vehicle over rough or uneven surfaces. In situations in which the target is marginally positioned so that reflected light is only adequately directed to the light receiver under static conditions, the bouncing of the flexible support assembly will cause the reflective target to cyclically move between adequate and inadequate reflecting positions relative to the light transmitter and receiver. This movement will cause cyclical braking and jerky travel motion of the vehicle and undesirable shifting of a load carried on the vehicle which will result in drive and steering wheel slippage on the underlying surface. The accuracy of the position of the self guided vehicle within the facility of operation is partially based on information obtained from the steerable wheel steering angle sensors and the drive wheel rotation and position sensors. As a result inaccurate information will be delivered from the sensors to the onboard computer which will result in inaccurate positioning of the vehicle.

The present invention is directed to overcoming one or more of the problems as set forth above.

DISCLOSURE OF THE INVENTION

In one aspect of the present invention, an obstacle detection system for a self guided vehicle having a frame upper end portion is provided. A delivering device is adapted for delivering light signal in a direction along a preselected elevationally oriented axis and a receiving device is adapted to receive a reflection of the light signal and deliver a condition control signal in response to receiving the reflected light signal. A supporting assembly is connected to and extends from the frame upper end portion and a guide frame, defining a plane passing through said axis, is connected to the supporting assembly. A reflecting member is supported on said guide frame in said plane. A connecting device attaches the reflecting member to the supporting assembly and maintains the reflecting member for movement between a first position, at which the reflecting member reflects the light signal toward the receiving device, and a second position, spaced from the first position, at which the reflecting device is free from reflecting a sufficient amount of the light signal toward the receiving device. The reflecting member is movable between the first and second positions in response to an external force being applied to the reflecting member.

In another aspect of the present invention, a self guided material handling vehicle has a frame upper end portion, a vehicle operating system, and an onboard computer connected to the vehicle operating system. A laser scanning device having an elevationally oriented axis of rotation is mounted on the frame upper end portion and connected to the onboard computer. The laser scanning device is adapted to deliver a laser signal in directions transversely about said axis, to receive a reflection of the laser signal, and to deliver a position control signal in response to receiving the reflected laser signal. A supporting assembly which is connected to the frame upper end portion and extends upwardly from the frame upper end portion at a location adjacent the laser scanning device. A guide frame which is connected to the supporting assembly defines a plane passing through the axis of the laser scanning device at a preselected location above the laser scanning device. A reflecting member is supported on said guide frame and movable in directions along the plane. A delivering device which is connected to the frame upper end portion is adapted for delivering a light signal in a direction along an elevationally oriented axis. A receiving device is adapted for receiving a reflection of the light signal and delivering a condition control signal in response to receiving the reflected light signal. The receiving device is connected to the frame upper end portion and the computer and adapted to deliver the condition control signal to the computer. A connecting device is adapted for connecting the reflecting member to the supporting assembly and maintaining the reflecting member for movement between a first position, at which the reflecting device intersects the delivering device elevationally oriented axis and reflects the light signal toward the receiving device, and a second position, spaced from the first position, at which the reflecting device is free from intersecting the elevationally oriented axis of the delivering device and free from reflecting a sufficient amount of the light signal toward the receiving device.

BRIEF DESCRIPTION OF THE DRAWINGS

FIG. 5 is a diagrammatic schematic of the vehicle control system.

BEST MODE FOR CARRYING OUT THE INVENTION

Figure 1:
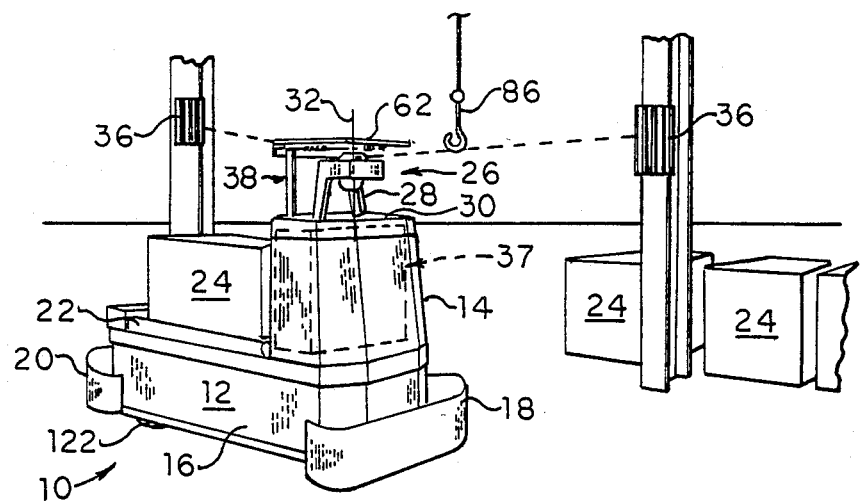
FIG. 1 is a diagrammatic isometric view of a self guided vehicle having a laser scanning device mounted on an upper end portion of the vehicle frame and an obstacle detection system for detecting objects near the laser scanner.

With reference to the drawings, and particularly FIG. 1, a self guided vehicle 10 has a frame 12 which has upper and lower end portions 14 and 16. The front and rear flexible bumpers 18 and 20 are mounted on the lower end portion 16 at locations elevationally below the frame upper end portion 14 so that the upper end portion 14 is at least partially unprotected by the bumpers 18 and 20. The self guided vehicle 10 has a load supporting deck 22 of any suitable type for carrying a load 24 thereon. It should be noted that, although the particular self guided vehicle 10 as shown herein has a roller deck, other suitable load carrying and lifting devices that are well known in the art may be substituted therefore without departing from the spirit of the inventions. Some examples of optional load carrying devices include lift masts, elevationally movable tables, and pallet transfer platforms.

A laser scanning device 26 is mounted on the upper end portion 14 of the frame 12. In particular, the laser scanning device 26 is mounted on a stand 28 which is connected to an upper surface 30 of the frame upper end portion 14. The laser scanning device 26 has an elevationally oriented axis of rotation 32 which is preferably normal to the direction of travel of vehicle 10 and the underlying surface. The laser scanning device 26 is adapted to deliver a laser signal in directions transversely to the axis 32 as it rotates 360 degrees about the axis 32. The laser scanning device 26 is adapted to receive a reflection of the laser signal and deliver a position control signal to an onboard computer 34, connected to the laser scanning device 34 by an electrical connector 33, in response to receiving the reflected laser signal. The delivered laser signals are reflected by target 36 located at spaced apart places within the facility in which the self guided vehicle 10 operates. The targets 36 are preferably bar coded so that the signals delivered to the onboard computer 34 are digital codes. The onboard computer 34 is capable of disseminating the coded information and through triangulation calculates the exact location of the self guided vehicle 10 within the facility. The computer 34 is preferably a microprocessor and a portion of the vehicle operating system 36 (FIG. 5). The vehicle operating system 36 will be discussed in greater detail subsequently.

Figure 2:
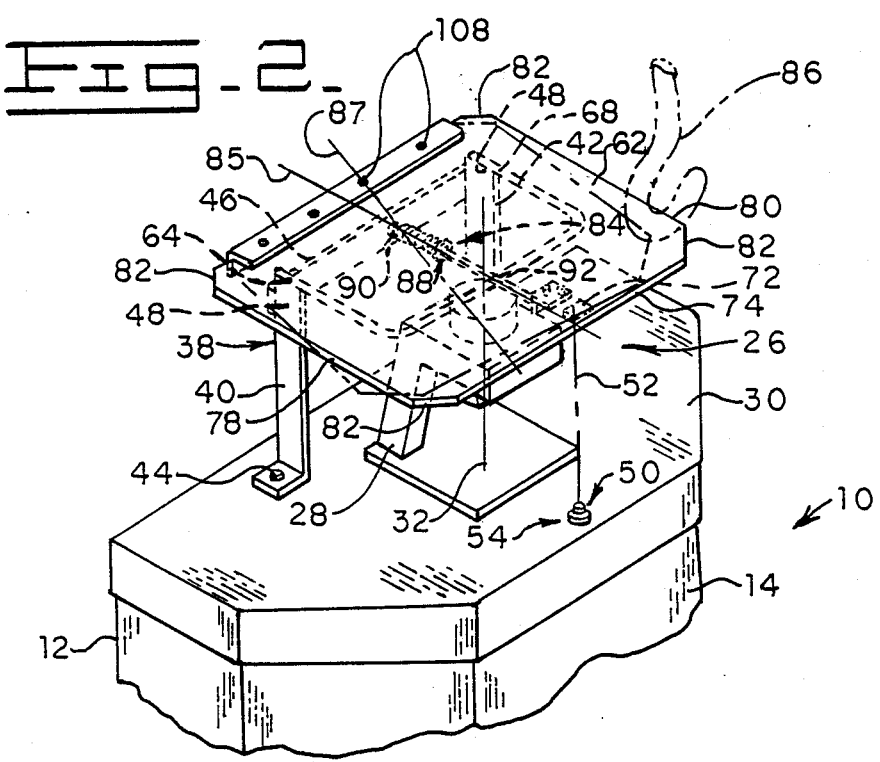
FIG. 2 is a partial diagrammatic isometric view of self guided vehicle of FIG. 1 showing the upper end portion, laser scanner, and obstacle detection system in greater detail.
Figure 3:
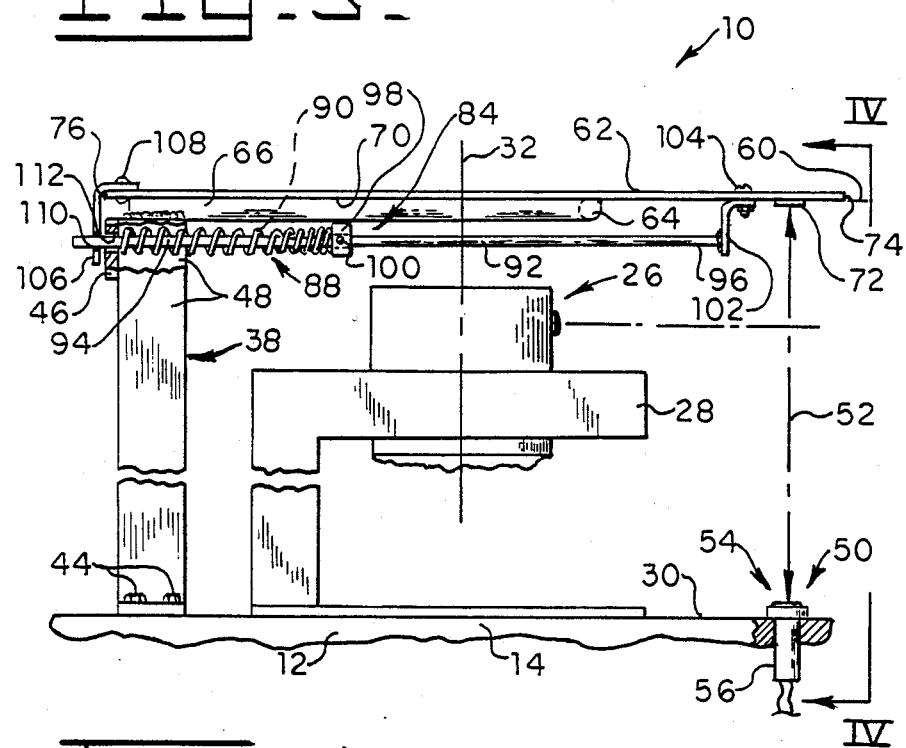
FIG. 3 is a partial enlarged diagrammatic side elevational view of the self guided vehicle of FIG. 1 showing the obstacle detection system in greater detail.
Figure 4:
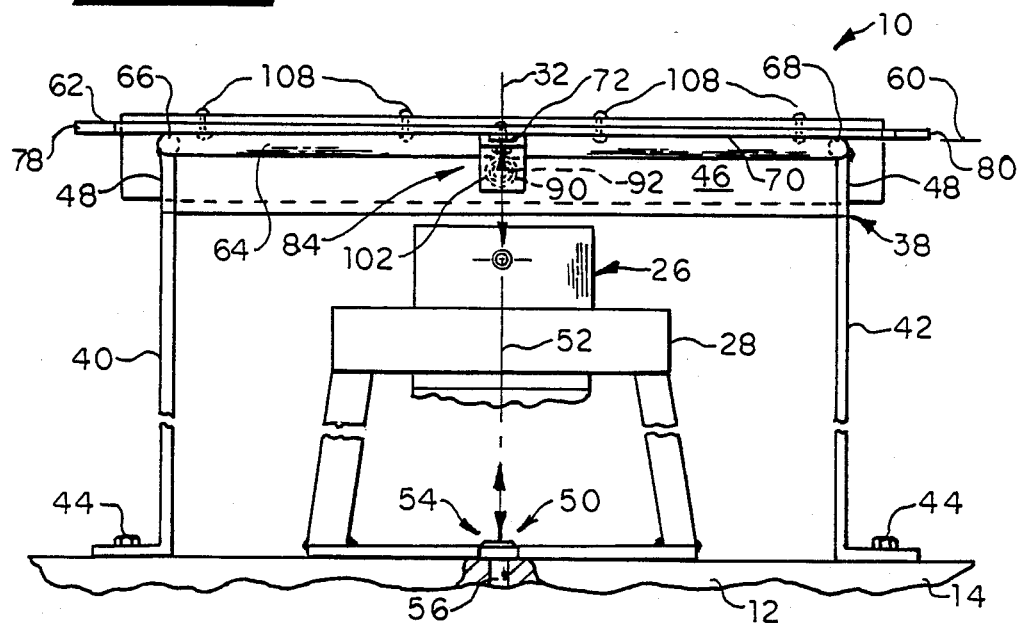
FIG. 4 is a partial diagrammatic view taken along lines IV-IV of FIG. 3.

An obstacle detection system 35 includes a supporting assembly 38 connected to the upper end portion 14 of frame 12 and extends upwardly from the frame upper end portion 14 at a location adjacent the laser scanning device 26. As best seen in FIGS. 2-4, the supporting assembly 38 includes first and second spaced apart right oriented supporting legs 40,42 which are connected to the upper surface 30 of frame 12 in any suitable manner such as by threaded fasteners 44. A cross-tie member 46 is connected to the first and second supporting legs 40,42 and maintains the supporting legs 40,42 at a predetermined distance from each other and provides the essential stiffness required. The cross-tie member 46 is preferably welded to the first and second supporting legs 40,42 at a location adjacent an upper end portion 48 of each of the first and second legs 40,42.

The obstacle detection system 35 also includes a means 50 for delivering a light signal in a direction along a preselected elevationally oriented axis 52, and a means 54 is provided for receiving a reflection of the delivered light signal and delivering a condition control signal in response to receiving the reflected light signal. The delivering and receiving means 50,54 are spaced a slight distance apart from one another within a common housing 56. The housing 56 is connected to the upper end portion 14 of frame 12 and in particular to the upper surface 30. The delivering and receiving means 50,44 are positioned relative to upper surface 30 so that the axis 52 of the delivered light signal is substantially parallel to the axis 32 of the laser scanning device 26. The elevationally oriented light signal axis 52 depicts the general direction of the delivered and reflected light beam signals. In reality, the delivered and reflected light beam signals may fan out slightly and deviate slightly from the mean axis 52. The amount of deviation permitted is a function of the intensity of the delivered light and the distance the light signal must travel before it is reflected. The delivering means 50 preferably is an infrared transducer and the receiving means 54 is preferably a photocell. The elevationally oriented axis 52 of the light signal of the delivering means 50 is substantially parallel and spaced from the axis of rotation 32 of the laser scanning device 26.

A guide frame 58 of the obstacle detection system 35 is connected to the supporting assembly 38 and defines a plane 60 which passes through the elevationally oriented axis 52. The plane 60 also passes through the elevationally oriented laser scanning device axis 32. The guide frame 58 is positioned above the laser scanning device 26 and a preselected distance from the laser scanning device 26 and the upper surface 30 of frame upper end portion 14. These distances are determined as a function of the shape and size of the laser signal delivered and the shape and size of a hereinafter discussed reflecting member 62. The guide frame 58 is of a construction suitable for supporting the reflecting member 62 thereon and guiding the reflecting member 62 for movement in the plane 60. The guide frame 58 preferably includes a substantially "U" shaped member 64 having first and second space apart end portions 66,68. The first end portion 66 is connected to the upper end portion 48 of the first supporting leg 40 and the second end portion 68 is connected to the upper end portion 48 of the second supporting leg 42. This connection is preferably made by welding the "U" shaped member 64 to the supporting legs 40,42. It should be noted that the "U" shaped member defines the plane 60 and supports the reflecting member 62 thereon for movement transfers the axis 52 and parallel to the surface upon, which the vehicle is supported. The "U" shaped member 64 is preferably constructed from cylindrical bar stock material. However, other bar stock cross-sections may be utilized.

The reflecting member 62 has a guide surface portion 70 which is supported on and engaged with the "U" shaped member 64 so that movement in plane 60 is permitted. The guide surface portion 70 has poor reflecting qualities and is unable to adequately reflect light signals directed by the delivering means 50. The reflecting member 62 also has a reflecting surface portion 72 which is retro-reflective and positioned to intersect the elevationally oriented light axis 52. The reflecting surface portion 72 is preferably retro-reflective tape or the like which is attached to the guide surface portion 70 at a location on the guide surface adjacent a first end 74 of the reflecting member 62. The reflecting member 62 has a second end 76 which is opposite and parallel the first end 74 and spaced therefrom. The reflecting member 62 also has first and second spaced apart substantially parallel sides 78,80. The first and second ends 74,76 and the first and second sides 78,80 defines the shape of the reflecting member 62 as being substantially rectangular sheet. The reflecting member 62 has a plurality of chamfered corners which smooths out the configuration by eliminating the sharp corners. The reflecting member is preferably manufactured from a light weight nonmetallic material.

The obstacle detection system 35 includes a means 84 for connecting the reflecting member 62 to the supporting assembly 38 and maintaining the reflecting member 62 for movement between a first position 85 at which the reflecting member 62 reflects the delivered light signal towards the receiving means 54, and a second position 87, spaced from the first position 85, at which the reflecting member is free from reflecting the delivered light signal towards the receiving means 54. The reflecting member 62 is movable between the first and second positions 85,87 in response to an external force being applied to the reflecting member 62. The second position of the reflecting member is any position spaced from the first position at which the reflected light received by the receiving means 54 is insufficient in magnitude to cause the receiving means 54 to deliver a condition control signal to the computer 34. Therefore, the second position would be established when the reflecting surface portion 72 is spaced from the axis 52 or at any position wherein the reflected light is of an inadequate intensity at the receiving means 54. The direction of movement of the reflecting member 62 is established by the direction of an external force on the reflecting member 62 acting along the plane 60. Engagement of a suspended object, such as a hook 86 of an overhead hoist system, with the reflecting member 62 will force the reflecting member 62 to move in the plane 60. When the amount of movement of the reflecting surface portion 72 to prevent adequate reflected light to be delivered to the receiving means 54 is encountered the vehicle 10 will stop travel. It should be noted that the reflecting member is moveable when contacted on either of the first end portion 66 or first and second sides 78,80.

The connecting means 84 includes means 88 for returning the reflecting member 62 toward the first position 85 in response to the force of a magnitude less than a preselected value being applied to the reflecting member 62. The returning means includes a spring 90 which is disposed between the reflecting member 62 and supporting assembly 38. The spring 90 biases the reflecting member towards the first position 85 and into engagement with the guide frame 58. In particular, the spring 90 is a compression spring and the returning means 88 includes a rod 92 having first and second spaced apart end portions 94,96 and a stop 98 connected to the rod 92 between the rod first and second end portions 94,96. The stop 98 is preferably a collar slidably disposed on the rod 92 and adjustably positioned along the rod 92 and fastened to the rod by a set screw 100. The longitudinal position of the stop 98 on the rod first end portion 94 determines a set point force of the spring and the minimum external force required to move the reflecting member 62. The rod second end portion 96 is connected to the reflecting member by an "L" shaped bracket 102, or its equivalent, which is fastened to the reflecting member 62 in any suitable manner such as by threaded fasteners 104. The rod second end portion 96 is connected to the bracket "L" shaped bracket 102 in any conventional manner such as by welding. A flange 106 is connected to the reflecting member 62 at a location adjacent the reflecting member second end portion 68 by a plurality of fasteners 108 such as thread fasteners, rivets, and the like. The flange has an "L" shaped configuration, but not limited thereto, and extends substantially normal to and elevationally downwardly from the reflecting member 62. The rod second end portion 96 is disposed in an aperture 110 in flange 106 and retained therein by virtue of the connection to bracket 102 which prevents axial movement of the rod 92 relative to the flange 106. The supporting assembly 38, and particularly the cross-tie member 46, has an aperture 112 disposed therein. The rod second end portion 96 is disposed in the cross-tie member aperture 112 which retains the reflecting member 62 on the "U" shaped member 64 of the supporting assembly 38 and from removal or separation therefrom. It is to be noted that the "U"

shaped member 64 is disposed between the reflecting member 62 and the rod 92 so that inadvertent separation of the reflecting member 62 will not take place.

The compression spring 90 is disposed about the rod first end portion 94 and between and in contact with the stop 98 and supporting assembly 38. In particular, the compression spring coaxially disposed about the rod first end portion 94 and forcibly engaged with the cross-tie member 46 of the supporting assembly so that the flange 106 is biased against the cross-tie member 46 by the spring 90. It is to be noted that the reflecting member 62, and in particular the reflecting surface portion 72, is at the first position when the flange 106 is engaged with the cross-tie member 46. The spring 90 tends to also urge the reflecting member 62 into engagement with the "U" shaped member 64 and maintain the reflecting member 62, and particularly the guide surface portion 70, in engagement with the "U" shaped member 64. The aperture 112 in cross-tie member 46 is preferably greater in diameter than the cross sectional diameter of rod 92 so that rod 92 is free to slide and pivot relative to the aperture 112. This freedom allows the reflecting member 62 to move in plane 60 in a direction determined by the force of a contacted object without causing damage to the reflecting member or associated components. Put another way the rod 92 is free to move in the aperture 112 which allows the reflecting member 62 to move in a direction of the component of external force lying in the plane 60. When the external force applied to the reflecting member 62 is less than the equivalent resulting force of the spring, the spring will urge the reflecting member 62 to the first position.

Referring to FIG. 5, the laser scanning device 26 includes a laser signal transmitting portion 114 which is adapted to deliver a laser signal in directions transversely about the elevationally oriented axis 32, and a laser signal receiving portion 116 which is adapted to receive a reflection of the laser signal and to deliver a position control signal to the computer 34 via electrical connector 33 in response to receiving the reflected signal. The onboard computer 34, of the vehicle operating system 37, responds to the delivered position control signals and controls operation of the self guided vehicle 10 by delivering control signals to various operating systems of the vehicle such as, the motor control system 118, the brake control system 120, and the steering control system (not shown). The motor control system 118 is connected to motors 122 by electrical connectors 117, 118. The motor control system varies the speed and direction of each of the drive motors 122 in response to the signals delivered from the computer 34 to the motor control system via electrical connector 121. The motors 122 are connected to vehicle drive wheels 124 and brakes 126. The signals delivered from the computer 34 to the brake control system 120 via electrical connector 123 which is connected to and between the computer 34 and brake control system 120 will determine the condition of the brakes 126 and either allow the brakes 126 to be applied or to prevent application thereof. The brakes are preferably spring applied and electrically actuated to the released position. Brakes 126 of the type discussed above are well known in the art and will not be discussed in any further detail.

The receiving means 54, which is connected to the computer 34 via electrical connector 125, delivers a control signal to the computer 34 via electrical connector 125 when the intensity of the light reflected from the reflecting surface portion 72 to the receiving means 54 is of a sufficient magnitude. The computer 34 responds to this control signal by delivering an enabling control signal to the brake control system 120 via conduit 123 which maintains the brake 126 from being applied and from retarding or preventing rotation of the wheels 124. Conversely, the computer 34 delivers a stop control signal, by either or both of the electrical connectors 121,123, in response to an absence of receiving the condition control signal from the receiving means 54 and stops powered travel of the vehicle 10. The stop control signal is received by either or both of the brake and/or motor control systems 118,120. The brake control system 120 will respond to the stop control signal and cause the spring applied brakes 126 to be allowed to be applied. The motor control system 118 will respond to the stop control signal and cause the motors 122 to cease powered rotation of the wheels 124. It should be recognized that the obstacle detection system is substantially "fail safe" since it requires the presence of a positive control signal from the receiving means 54 to maintain the brakes 126 in an off position at which the wheels 124 are free to rotate.

INDUSTRIAL APPLICABILITY

With reference to the drawings, and in operation, a self guided vehicle 10 under the power of the drive motors 122 and under control of onboard computer 34 traverses the underlying surface upon which it is supported between locations within the facility of operation. The laser scanning device 26 continuously reads bar coded targets 36 and delivers this information to the onboard computer 34. The onboard computer 34, calculates using triangulation the location of the vehicle 10 based on information received from the bar coded targets 36, compares this information with information delivered from onboard sensing devices (not shown), and adjusts the direction of travel of the vehicle in accordance with preprogrammed instructions. In the absence of any contact between the reflecting member 62 and an external object, the vehicle will perform its planned tasks and move throughout the facility as instructed by the computer 34.

Should the self guided vehicle 10 encounter an external object such as a hook 86, which is at an elevational position spaced from the front and rear bumpers 18,20, the potential for damage to the laser scanning device 26 and/or the upper end portion 14 of frame 12 and the vehicle operating system 36 which includes the motor control 118 brake control 120 onboard computer 34 and other operating system controls housed therein. Should the hook 86 forcibly engage the reflecting member 62, the force applied thereto will cause the reflecting member 62 to move in a direction of the applied force until the reflecting surface portion 72 is spaced from the first position 85 and no longer capable of adequately reflecting light of intensity adequate to cause the receiving means 54 to deliver a control signal in response thereto. It is preferred that the axis 52 of the light signal does not intersect the reflecting surface portion 72 at the second position 87. Movement of the reflecting member 62 is permitted through the provision of the connecting means 84 and the returning means 88. The external force as applied to any one of the first and second sides 78,80 or first end 74 of the reflecting member will cause pivotal and/or longitudinal movements of the reflecting member 62 depending on the direction and location of the force. The rod 92, spring 90, and the aperture 112 in the cross-tie member 46 cooperate to allow this motion. Travel of the self guided vehicle 10, subsequent to contact with the overhead object, will cease when movement of the reflecting member 62 is adequate to move the reflecting surface portion 72 in an amount sufficient to prevent adequate reflected light to be delivered to the receiving means 54.

Removal of the external force by either moving the hook 86 or the vehicle 10 will enable the spring 90 to return the reflecting member 62 to the first position 85 at which the reflected light from the delivering means 50 is adequate in intensity to cause the receiving means 54 to deliver a control signal to the onboard computer 34 so that the brakes 126 may be released and the motor control 118 is enabled.

Other aspects, objects and advantages of the present invention can be obtained from a study of the drawings, the disclosure, and the appended claims.

I claim:

1. An obstacle detection system for a self guided vehicle having a frame upper end portion comprising:
   means for delivering a light signal in a direction along a preselected elevationally oriented axis;
   means for receiving a reflection of the light signal and delivering a condition control signal in response to receiving said reflected light signal;
   a supporting assembly connected to and extending from the frame upper end portion;
   a guide frame connected to the supporting assembly and defining a plane passing through said elevationally oriented light signal axis;
   a reflecting member movably supported on said guide frame and movable in said plane;
   means for connecting the reflecting member to the supporting assembly and maintaining said reflecting member for movement substantially along the plane defined by the guide frame, between a first position, at which said reflecting member reflects said light signal toward said receiving means, and a second position, spaced from said first position, at which said reflecting member is free from reflecting a sufficient amount of said light signal toward said receiving means, said reflecting member being movable between said first and second positions in response to an external force of a preselected minimum magnitude being applied to said reflecting member and said second position of the reflecting member being located substantially in the direction of the applied force lying along said plane.

2. An obstacle detection system, as set forth in claim 1, wherein said connecting means includes means for returning the reflecting member toward the first position in response to said force being of a magnitude less than a preselected value.

3. An obstacle detection system, as set forth in claim 2, wherein said returning means includes, a spring disposed between the reflecting member and supporting assembly, said spring biasing said reflecting member towards said first position and into engagement with said guide frame.

4. An obstacle detection system as set forth in claim 3, wherein said spring is a compression spring and said returning means includes a rod having first and second end portions and a stop connected to said rod between said first and second end portions, said rod second end portion being connected to the reflecting member and said rod first end portion being disposed in an aperture in said supporting assembly, said compression spring being disposed about said rod first end portion and between and in contact with said stop and supporting assembly.

5. An obstacle detection system, as set forth in claim 4, wherein said rod has a preselected diameter and the aperture in the supporting assembly is greater in magnitude than the diameter of said rod, said rod being free to move in said aperture and said reflecting member being movable in a direction of the component of external force lying in said plane.

6. An obstacle detection system, as set forth in claim 1, wherein said reflecting member has a guide surface portion slidably supported on the guide frame and moveable in said plane.

7. An obstacle detection system, as set forth in claim 6, wherein said supporting assembly includes first and second spaced apart supporting legs and said guide frame includes a substantially "U" shaped member having first and second spaced apart end portions, said first and second end portions of the "U" shaped member being respectively connected to the first and second supporting legs.

8. An obstacle detection system, as set forth in claim 6, wherein said connecting means includes means for returning said reflecting member to said first position.

9. An obstacle detection system, as set forth in claim 8, wherein said supporting assembly includes a cross-tie member having an aperture disposed therein and said returning means includes:
   a rod having a first end portion disposed in the cross-tie member aperture and connected to the reflecting member, and a second end portion connected to the reflecting member;
   a stop connected to the rod first end portion; and
   a compression spring coaxially mounted on the rod and disposed between and in forceable engagement with the cross-tie and stop members.

10. An obstacle detection system, as set forth in claim 8, including;
    a cross-tie member connected to said supporting assembly; and
    a flange connected to and extending downwardly from said reflecting member, said returning means urging said flange into engagement with said cross-tie member and said flange being engaged with the cross-tie member at the first position of the reflecting member.

11. An obstacle detection system, as set forth in claim 10, wherein said cross-tie member has an aperture disposed therein and said returning means includes;
    a rod having first and second end portions and being connected at the rod first end portion to the flange and at the rod second end portion to the reflecting member, said rod first end portion being disposed in the aperture;
    a stop mounted on the rod first end portion; and
    a compression spring coaxially mounted on the rod first end portion at a location between and in forceable engagement with the cross-tie and stop members.

12. An obstacle detection system, as set forth in claim 2, including a flange connected to and extending downwardly from said reflecting member, said returning means urging the flange into engagement with the supporting assembly and said flange being engaged with the supporting assembly at the first position of the reflecting member.

13. An obstacle detection system, as set forth in claim 1, wherein said reflecting member includes:
- a guide surface portion slidably carried on the supporting assembly; and
- a retro-reflective surface portion intersecting the elevationally oriented light signal axis at the first position of the reflecting member and spaced from intersecting the light signal elevationally oriented axis at the second position of the reflecting member, said retro-reflective surface portion reflecting said light signal toward said receiving means at the first position of the reflecting member.

14. A self guided material handling vehicle having a frame upper end portion and a vehicle operating system having an onboard computer, comprising:
- a laser scanning device having an elevationally oriented axis of rotation and being mounted on the frame upper end portion and connected to said onboard computer, said laser scanning device being adapted to deliver a laser signal in directions transversely about said elevationally oriented axis of rotation, to receive a reflection of the laser signal, and to deliver a position control signal in response to receiving the reflected laser signal;
- a supporting assembly connected to the frame upper end portion and extending upwardly from the frame upper end portion at a location adjacent the laser scanning device;
- means for delivering a light signal in a direction along an elevationally oriented axis, said delivering means being connected to said frame upper end portion;
- a guide frame connected to the supporting assembly and defining a plane passing through the light signal axis at a preselected location above said laser scanning device;
- a reflecting member supported on said guide frame and movable in directions along said plane;
- means for receiving a reflection of said light signal and delivering a condition signal in response to receiving said reflected light signal, said receiving means being connected to said frame upper end portion and said computer and being adapted to deliver said condition control signal to said computer;
- means for connecting the reflecting member to the supporting assembly and maintaining said reflecting member for movement substantially along the plane defined by the guide frame between a first position, at which said reflecting member intersects said delivering means light signal elevationally oriented axis and reflects said light signal toward said receiving means, and a second position, spaced from said first position, at which said reflecting means is free from intersecting the light signal elevationally oriented axis of the delivering means and is free from reflecting a sufficient amount of said light signal toward said receiving means, said movement of the reflecting assembly being in response to an external force of a preselected minimum magnitude being applied to the reflecting member and said second position of the reflecting member being located in a direction of the applied force lying along said plane.

15. A self guided material handling vehicle, as set forth in claim 14, wherein said reflecting member is moveable between said first and second positions above said laser scanning device in response to an external force being applied thereto, and the connecting means includes means for returning the reflecting member toward the first position in response to said external force being of a magnitude less than a preselected value.

16. A self guided material handling vehicle, as set forth in claim 15, wherein said returning means biases said reflecting member into engagement with said guide frame and substantially maintains said reflecting member in said plane.

17. A self guided material handling vehicle, as set forth in claim 16, wherein said returning means includes:
- a rod having first and second spaced apart end portions and being slidably pivotally connected at the rod first end portion to the supporting assembly and connected at the rod first and second end portions to the reflecting member;
- a stop connected to the rod first end portion; and
- a compression spring being disposed about the rod, between the stop (98) and supporting assembly, and in forceable engagement with the stop and supporting assembly.

18. A self guided material handling vehicle, as set forth in claim 15, wherein said computer delivers an enabling control signal to a brake control system and a motor control system in response to receiving said condition control signal and permits powered travel of the self guided material handling vehicle.

19. A self guided material handling vehicle, as set forth in claim 18, wherein said computer delivers a stop control signal to the brake and motor control systems in response to an absence of receiving said condition control signal and stops powered travel of the self guided material handling vehicle.

20. A self guided vehicle, as set forth in claim 14, wherein said light signal elevationally oriented axis is substantially parallel to and spaced from the axis of rotation of the laser scanning device.

* * * * *